Aug. 25, 1931.  P. E. HUNTER  1,820,140
PIPE THREAD PROTECTOR
Filed July 26, 1929
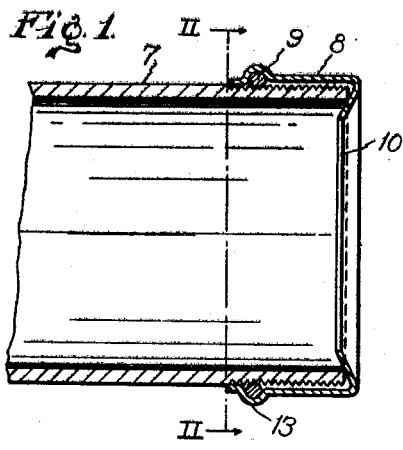
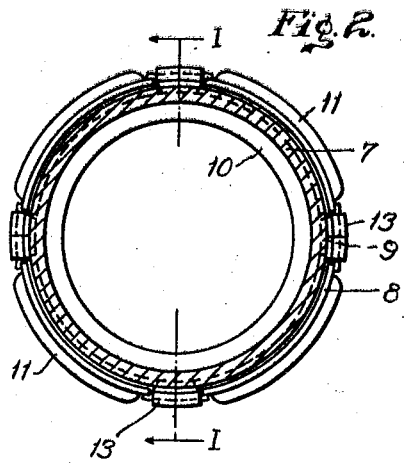
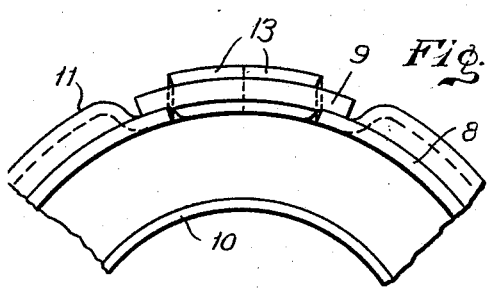
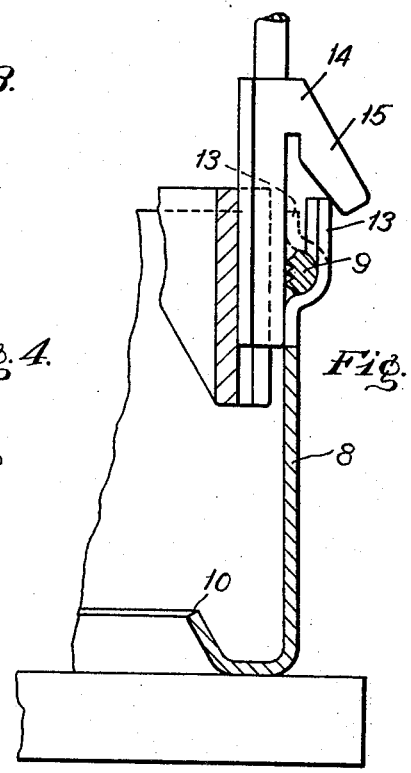
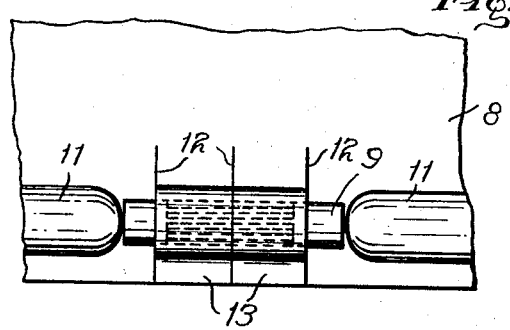
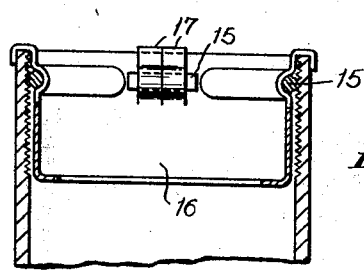
INVENTOR
Percy E. Hunter,
By Archworth Martin,
Attorney.

Patented Aug. 25, 1931

1,820,140

UNITED STATES PATENT OFFICE

PERCY E. HUNTER, OF PITTSBURGH, PENNSYLVANIA

PIPE THREAD PROTECTOR

Application filed July 26, 1929. Serial No. 381,371.

My invention relates to thread protectors, such as are employed in protecting the threads of pipes, shafts, rods, etc., for the purpose of preventing injury thereto while being shipped or handled previous to installation.

One object of my invention is to provide a protector that may be more easily applied than some of the forms now employed, and with less danger of damage to the threads.

Another object of my invention is to provide a protector structure composed of parts that are normally in unitary relation, thus avoiding loss of any of the parts constituting a protector, previous to installation thereof upon a pipe, and which may nevertheless be assembled upon a pipe without screwing it thereon.

Still another object of my invention is to provide an improved method of making thread protectors and assembling them upon threaded pipes or the like.

One form which my invention may take is shown in the accompanying drawings, wherein Figure 1 is a longitudinal sectional view of a portion of a pipe with my protector applied thereto, taken on the line I—I of Fig. 2; Fig. 2 is a view taken on the line II—II of Fig. 1; Fig. 3 is a fragmentary end elevational view, on an enlarged scale, of the protector at a preliminary stage in the assembly of the parts thereof; Fig. 4 is a plan view of the structure of Fig. 3; Fig. 5 is a view showing the manner in which the protector parts are assembled to form a unitary structure, and Fig. 6 is a modification of Fig. 1, showing a protector structure applied to the inside threads of a pipe.

In Figs. 1 and 2, I have shown the protector as applied to a pipe 7. The protector comprises a collar 8 and a key or stop 9. The collar 8 is bent in at its outer end as indicated at 10 to more effectively protect the end of the pipe. The collar 8 is preferably of sheet metal and may be stamped to the form shown, with beaded portions 11 disposed circumferentially thereof to serve as a rolling surface which facilitates handling of the pipe.

The key 9 consists of a bar preferably of lead or other soft metal that may be threaded at its inner side for engagement with the threads of the pipe so that when the protector is in position, it will be held against sliding movement on the pipe.

In order to hold the key in assembled relation with respect to the collar 8, I slit the collar at the points 12 (Fig. 4) to form tongues 13 which I bend outwardly as shown more clearly in Figs. 3 and 5. The key is placed beneath these tongues in the manner shown in Figs. 3, 4 and 5, whereupon a shaping tool 14, having a camming arm 15, is brought into position as shown in Fig. 5 and moved axially of the collar 8 to depress the tongues 13 to the position indicated in dotted lines in Fig. 5. The tongues may thus be curved about the key 9 a distance slightly greater than 180° so that it will be held in assembled relation with the collar during handling of the collar previous to installation thereof on a pipe. If the ends of the key 9 project into overlapping relation with those portions of the collar adjacent to the outer slots 12, as shown in Figs. 3 and 4, only a slight curve will be required in the tongues 13 to prevent the key sliding out of position.

A collar with the key held therein may then be placed upon a pipe end simply by sliding it to the position shown in Fig. 1, whereupon the outer portions of the tongue 13 may be struck with a hammer to force the key inwardly and cause its threads to engage with the pipe threads. If the ends of the key overlap unslit portions of the collar as shown in Figs. 3 and 4, and the key is of soft material, the projecting portions thereof will be bent to permit its threaded or toothed portion to be forced into interlocking engagement with the pipe threads. When it is desired to remove the protector it can be either unscrewed from the pipe or the free ends of the tongue 13 may be bent outwardly to release the key, and the collar then slid from the pipe.

As shown in Fig. 6, a protector for inside pipe threads is formed in the manner above-described except that a key or stop 15, threaded at its outer side, is held in assembled relation at the outer diameter of a collar 16, by tongues 17. The protector may be inserted in a pipe end and the key forced into engagement with the pipe threads. If desired, the tongues 17 may be elongated and bent over the end of the pipe.

From the foregoing it will be seen that I provide a protector comprising a collar and a sleeve that are held in unitary relation, both previous to and after installation thereof, and which may nevertheless be placed upon a pipe or other threaded member by merely sliding it into position thereon and then imparting a hammer blow thereto.

I claim as my invention:—

1. A thread protector comprising a collar having a tongue struck from one end thereof and offset radially of the collar, and a key disposed beneath said tongue and having its ends supported by adjacent portions of the collar, the outer end of the tongue being bent inwardly to retain the key in position, and the collar being composed of deformable material which will permit movement of the key to operative position.

2. The method of making a thread protector, which comprises forming a tongue on a collar, offsetting the tongue relative to the body portion of said collar, and bending said tongue to partially embrace a key and support the same in inoperative position with respect to a pipe thread.

3. The method of forming a thread protector, which comprises slitting one end of a metal collar to form a tongue, and bending said tongue to partially embrace a key and support the same on the collar in inoperative position with respect to a threaded member to which the collar is adapted to be applied.

4. A thread protector comprising a collar having a deformable portion radially offset from the body portion thereof, and a key disposed beneath said offset portion and having its ends supported by adjacent portions of the collar, the said key being deformable under hammer blows imposed on the said offset portion, which will permit movement of the key to operative position.

In testimony whereof I, the said PERCY E. HUNTER, have hereunto set my hand.

PERCY E. HUNTER.